(12) United States Patent
Nakamura et al.

(10) Patent No.: US 8,444,520 B2
(45) Date of Patent: May 21, 2013

(54) GEAR DEVICE

(75) Inventors: Koji Nakamura, Tsu (JP); Masashi Imai, Tsu (JP); Kenichi Fujimoto, Tsu (JP)

(73) Assignee: Nabtesco Corporation (JP)

( * ) Notice: Subject to any disclaimer, the term of this patent is extended or adjusted under 35 U.S.C. 154(b) by 199 days.

(21) Appl. No.: 12/934,185

(22) PCT Filed: Mar. 26, 2009

(86) PCT No.: PCT/JP2009/056119
§ 371 (c)(1),
(2), (4) Date: Sep. 23, 2010

(87) PCT Pub. No.: WO2009/119737
PCT Pub. Date: Oct. 1, 2009

(65) Prior Publication Data
US 2011/0015024 A1    Jan. 20, 2011

(30) Foreign Application Priority Data

Mar. 28, 2008 (JP) .................................. 2008-086593

(51) Int. Cl.
*F16H 1/32* (2006.01)

(52) U.S. Cl.
USPC ....................................................... 475/162

(58) Field of Classification Search
USPC .................... 475/162, 163, 178, 179
See application file for complete search history.

(56) References Cited

U.S. PATENT DOCUMENTS

| | | | | |
|---|---|---|---|---|
| 7,935,017 B2 * | 5/2011 | Kurita et al. | ................... | 475/162 |
| 8,029,400 B2 * | 10/2011 | Nakamura | .................... | 475/162 |
| 2008/0045369 A1 | 2/2008 | Tamenaga | | |
| 2009/0118050 A1 | 5/2009 | Takeuchi | | |
| 2010/0179013 A1 * | 7/2010 | Nakamura | .................... | 475/179 |

FOREIGN PATENT DOCUMENTS

| | | |
|---|---|---|
| CN | 101048239 | 10/2007 |
| JP | 2002-106650 | 4/2002 |
| JP | 2007-218436 | 8/2007 |
| JP | 2007-321970 | 12/2007 |
| JP | 2008-39161 | 2/2008 |
| JP | 2008-62377 | 3/2008 |
| WO | 2007125835 | 11/2007 |

OTHER PUBLICATIONS

Supplementary European Search Report, Mar. 29, 2011.

* cited by examiner

*Primary Examiner* — Justin Holmes
*Assistant Examiner* — David J Hlavka
(74) *Attorney, Agent, or Firm* — Gerald E. Hespos; Michael J. Porco; Matthew T. Hespos

(57) ABSTRACT

A gear device has an outer cylinder fixed to a first mating member and a crankshaft inside the outer cylinder. An external gear is mounted to an eccentric portion of the crankshaft and meshes with internal teeth of the outer cylinder. A carrier is fixed to a second mating member. Rocking rotation of the external gear rotates the carrier coaxially to the outer cylinder. A cylindrical body is inserted in an axial through-hole of the carrier. The carrier has a first portion on one end of the cylindrical body and a second portion on an axially intermediate portion of the cylindrical body. The other end of the cylindrical body extends toward a corresponding mating member while protruding axially beyond the second portion. An outer diameter of remaining portions of the cylindrical body do not exceed an outermost diameter of the portion on which the first and second portions are fit.

7 Claims, 5 Drawing Sheets

GEAR DEVICE

BACKGROUND OF THE INVENTION

1. Field of the Invention

The present invention relates to a gear device.

2. Description of the Related Art

Heretofore, there has been known a gear device designed to obtain an output rotation at a speed reduced from an input rotation by allowing an external gear to be rockingly rotated while being meshed with internal teeth of an outer cylinder, according to an eccentric portion of a crankshaft. One example of this type of gear device is disclosed in the JP 2002-106650.

FIG. 5 is a vertical sectional view of a gear device disclosed in the JP 2002-106650. In this gear device, a crankshaft 104 having two eccentric portions 104a, 104b arranged in side-by-side relation in an axial direction thereof is provided inside an outer cylinder 102 in a rotatable manner about an axis thereof. Although not illustrated in FIG. 5, a similar crankshaft other than the crankshaft 104 is also provided inside the outer cylinder 102, and these crankshafts are arranged at even intervals around a central axis of the outer cylinder 102. External gears 108a, 108b are mounted to the eccentric portions 104a, 104b of each of the crankshaft 104 and other crankshaft, through bearings 106a, 106b, respectively. A large number of internal-tooth pins 102a are provided on an inner surface of the outer cylinder 102 over the entire circumference thereof. Each of the external gears 108a, 108b is meshed with the internal-tooth pins 102a.

Further, a carrier 112 is housed in the outer cylinder 102. This carrier 112 is mounted to the outer cylinder 102 through a pair of bearings 110a, 110b in a relatively and coaxially rotatable manner with respect to the outer cylinder 102. The outer cylinder 102 is joined to a partition member 114 in one of axially opposite end portions thereof. On the other hand, the carrier 112 is joined to a table 116 as a turning body, at an end portion thereof on the side opposite to the partition member 114. Each of the carrier 112, the partition member 114, the table 116 and the external gears 108a, 108b has a through-hole provided in a central region thereof to axially penetrate therethrough.

A cylindrical body 118 is inserted in the through-holes, and fixed to the carrier 112. Specifically, the cylindrical body 118 has a flange 118a provided on an outer surface thereof at a position adjacent to a lower end portion thereof to protrude radially outwardly. This flange 118a is fastened to the carrier 112 by a plurality of bolts 120, whereby the cylindrical body 118 is fixed to the carrier 112. The lower end portion of the cylindrical body 118 protrudes from a lower end of the carrier 112. In assembling between the table 116 and the carrier 112, the lower end portion of the cylindrical body 118 protruding from the lower end of the carrier 112 is fitted into the through-hole of the table 116. This allows central axes of the table 116 and the carrier 112 to be readily aligned each other. Further, a ring-shaped external-fitting member 115 is mounted around the through-hole opened in an upper end surface of the partition member 114. An upper end portion of the cylindrical body 118 is inserted in the external-fitting member 115, while protruding from an upper end of the partition member 114 through the through-hole of the partition member 114. A sealing member 115a is provided between an inner surface of the external-fitting member 115 and the outer surface of the cylindrical body 118. The sealing member 115a is operable to prevent lubricant filled in the gear device from leaking from between the inner surface of the external-fitting member 115 and the outer surface of the upper end portion of the cylindrical body 118.

However, in the gear device disclosed in JP 2002-106650, the cylindrical body 118 is fixed to the carrier 112 only by a structure where the flange 118a provided adjacent to the lower end portion of the cylindrical body 118 is fastened to the carrier 112. Consequently, when the cylindrical body 118 is rotated together with the carrier 112, vibration occurs in the upper end portion of the cylindrical body 118 in a radial direction thereof, and thereby a small gap is likely to occur between the upper end portion of the cylindrical body 118 and the sealing member 115a to cause leakage of lubricating oil.

Further, in the gear device disclosed in JP 2002-106650, the flange 118a is integrally provided on the cylindrical body 118 to protrude outwardly in the radial direction of the cylindrical body 118. As a prerequisite to accurately form the flange 118a, it is necessary to form the flange 118a by cutting. In this case, it is necessary to entirely remove axially opposite sides of the flange 118a in a material of the cylindrical body 118, by cutting. Therefore, most of the cylindrical body 118 has to be subjected to cutting in a length direction thereof, resulting in an increase of time and effort required for the machining of the cylindrical body.

SUMMARY OF THE INVENTION

It is an object of the present invention to suppress the occurrence of radial vibration in an end portion of the cylindrical body extending toward a mating member to be connected to a gear device and prevent an increase in time and effort required for machining of the cylindrical body.

According to one aspect of the present invention, there is provided a gear device capable of transmitting rotational force between a pair of mating members at a predetermined speed reduction ratio. The gear device comprises: an outer cylinder fixed to one of the mating members and provided with internal teeth on an inner surface thereof; a crankshaft provided inside the outer cylinder in a rotatable manner about an axis thereof and having an eccentric portion; an external gear mounted to the eccentric portion of the crankshaft and adapted to be rockingly rotated while being meshed with the internal teeth, in conjunction with an eccentric rotation of the eccentric portion; a carrier fixed to the other mating member and having a through-hole formed in a central region thereof to axially penetrate therethrough, wherein the carrier is adapted, according to the rocking rotation of the external gear transmitted thereto, to be rotated relatively and coaxially with respect to the outer cylinder; and a cylindrical body fittingly inserted in the through-hole to become coaxial with the carrier, wherein the carrier has a first portion externally fitted to one of opposite end portions of the cylindrical body, and a second portion disposed in axially spaced-apart relation to the first portion and externally fitted to an axially intermediate portion of the cylindrical body, and wherein: the other end portion of the cylindrical body extends toward a corresponding one of the mating members while protruding axially outwardly beyond the second portion; and a remaining portion other than the two portions of the cylindrical body to which the first and second portions are externally fitted, has an outer diameter equal to or less than an outermost diameter of the portion to which the first portion is externally fitted, and an outermost diameter of the portion to which the second portion is externally fitted.

DETAILED DESCRIPTION OF THE PREFERRED EMBODIMENTS

With reference to the drawings, embodiments of the present invention will now be specifically described based.

First Embodiment

Firstly, with reference to FIGS. 1 to 3, a structure of a gear device according to a first embodiment of the present invention will be described.

The gear device according to the first embodiment is used, for example, as a speed reducer in turning sections such as a turning body and an arm joint of a robot, or turning sections of various machine tools. The following description of the first embodiment will be made about one example where the gear device is used in a turning body of a robot.

Figure 1:
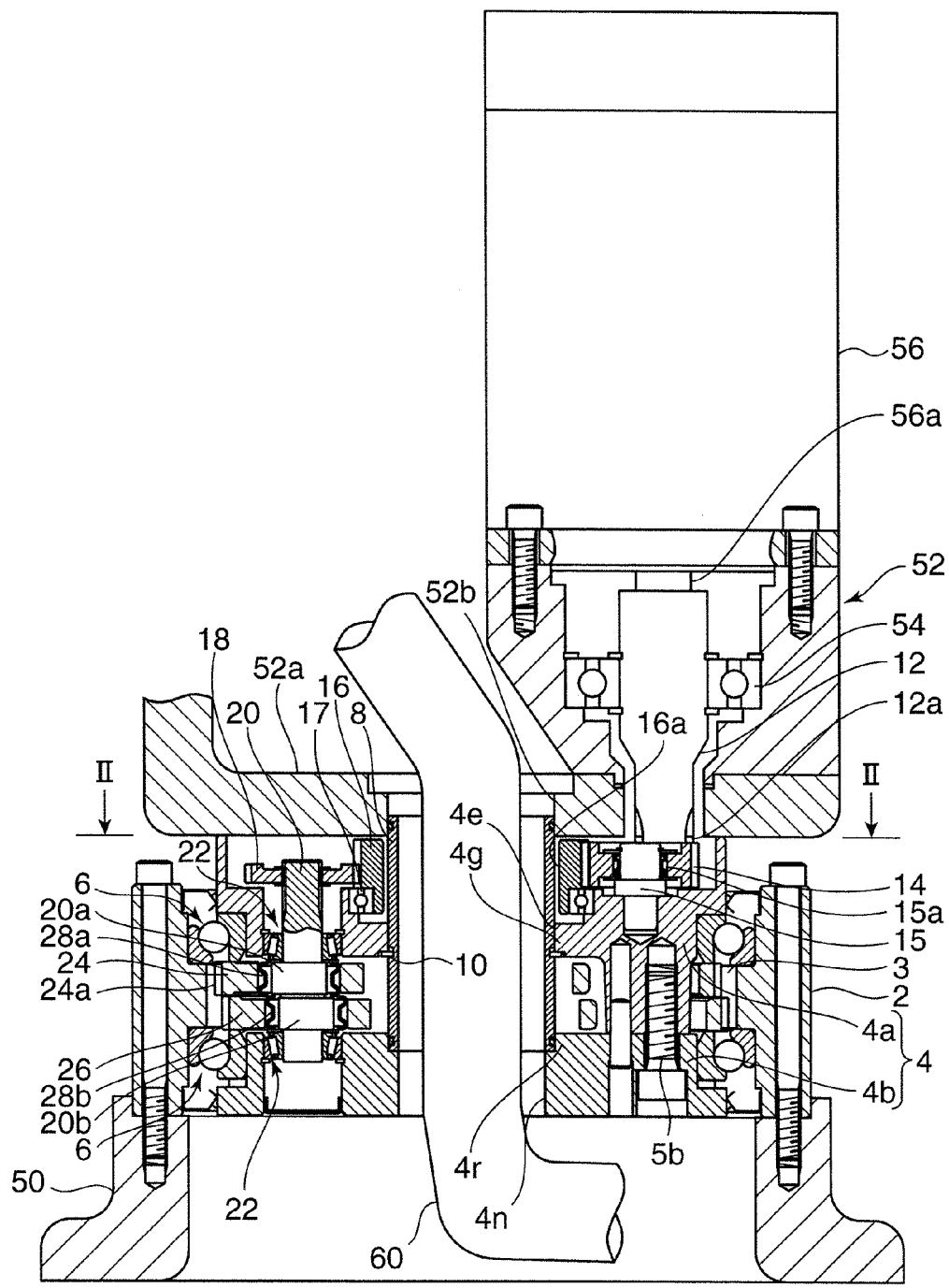
FIG. 1 is a vertical sectional view of a gear device according to a first embodiment of the present invention, a turning body, and a base.

As shown in FIG. 1, the gear device according to the first embodiment is adapted to be capable of transmitting rotational force between a base 50 and a turning body 52 at a predetermined speed reduction ratio. The base 50 is encompassed in a concept of one of a pair of mating members in the appended claims, and the turning body 52 is encompassed in a concept of the other mating member in the appended claims. The gear device according to the first embodiment comprises an outer cylinder 2, an internal-tooth pin 3, a carrier 4, a carrier bearing 6, a cylindrical body 8, a protruding member 10, an input shaft 12, an intermediate gear 14, a central gear 16, a crankshaft gear 18, a crankshaft 20, a crankshaft bearing 22, a first external gear 24, a second external gear 26, a first roller bearing 28a, and a second roller bearing 28b.

The outer cylinder 2 functions as a casing defining an outer surface of the gear device. The outer cylinder 2 is formed in an approximately circular cylindrical shape. The outer cylinder 2 is fastened to an upper portion of the base 50 fixed onto an installation surface. A large number of the internal-tooth pins 3 are arranged on an inner surface of the outer cylinder 2 at even intervals in a circumferential direction thereof. The internal-tooth pins 3 are encompassed in a concept of internal teeth in the appended claims.

The carrier 4 is housed in the outer cylinder 2 while being disposed coaxially with the outer cylinder 2. The carrier 4 is adapted to be rotated relatively and coaxially with respect to the outer cylinder 2. The carrier 4 is fastened to a lower end of the turning body 52 by a plurality of bolts 5a (see FIG. 2). When the carrier 4 is relatively rotated with respect to the outer cylinder 2, the turning body 52 is turned with respect to the base 50.

Specifically, the carrier 4 is supported by a pair of the carrier bearings 6 provided in axially spaced-apart relation, in a relatively rotatable manner with respect to the outer cylinder 2. The carrier 4 comprises a basal segment 4a and an end plate segment 4b which are fastened to each other in such a manner that the first external gear 24 and the second external gear 26 are housed therebetween.

The basal segment 4a has a basal plate portion 4c disposed adjacent to an upper end portion of the outer cylinder 2 in the outer cylinder 2, and shaft portions 4d extending downwardly from the basal plate portion 4c. The shaft portions 4d is fastened to the end plate segment 4b by bolts 5b. In this way, the basal segment 4a and the end plate segment 4b are integrated together (see FIG. 3).

The basal plate portion 4c has a through-hole 4e provided in a radially central region thereof to axially penetrate therethrough. The cylindrical body 8 is inserted into the through-hole 4e, as described later. The through-hole 4e includes a cylindrical body-supporting hole section 4f.

The cylindrical body-supporting hole section 4f has a cross-sectionally circular shape having a center on a central axis of the carrier 4. The cylindrical body-supporting hole section 4f has an inner diameter approximately equal to an outer diameter of the cylindrical body 8. In the basal plate portion 4c, a region around the cylindrical body-supporting hole section 4f makes up a second portion 4g which is externally fitted to an axially intermediate portion of the cylindrical body 8. An inner surface of the cylindrical body-supporting hole section 4f is in close contact with an outer surface of the axially intermediate portion of the cylindrical body 8. In other words, the second portion 4g supports the axially intermediate portion of the cylindrical body 8 to prevent it from wobbling in a radial direction of the cylindrical body 8. Further, a protruding member-fitting section 4h comprised of a circular-shaped depression is provided in a lower surface of the basal plate portion 4c around the cylindrical body-supporting hole section 4f. The protruding member 10 is fitted into the protruding member-fitting section 4h. A portion of the basal plate portion 4c which is located on the upper side of the protruding member-fitting section 4h makes up one clamping portion 4i of a pair of clamping portions.

The end plate segment 4b has a through-hole 4n provided in a radially central region thereof to axially penetrate therethrough. In the first embodiment, the through-hole 4n of the end plate segment 4b and the through-hole 4e of the basal plate portion 4c make up a through-hole of the carrier 4. The through-hole 4n has a cross-sectionally circular shape having a center on the central axis of the carrier 4. An upper region of the through-hole 4n is formed as a cylindrical body-fitting hole 4p comprised of a circular depression having a slightly enlarged diameter. The cylindrical body-fitting hole 4p has a diameter approximately equal to the outer diameter of the cylindrical body 8. A lower end portion of the cylindrical body 8 is internally fitted to the cylindrical body-fitting hole 4p. In the end plate segment 4b, a region around the cylindrical body-fitting hole 4p makes up a first portion 4r which is externally fitted to the lower end portion of the cylindrical body 8. As above, the first portion 4r and the second portion 4g each externally fitted to the cylindrical body 8 are disposed in spaced-apart relation to each other in an axial direction of the cylindrical body 8. A portion of the end plate segment 4b which is located on the lower side of the cylindrical body-fitting hole 4p and contacted with the lower end portion of the cylindrical body 8 makes up the other clamping portion 4q.

The cylindrical body 8 consists of a circular cylindrical-shaped pipe adapted to allow a distribution cable 60 to be pass therethrough. The cylindrical body 8 is operable to prevent a contact between the cable 60 and each of the gears and others inside the gear device, while preventing lubrication oil or the like from getting thereinto. The cylindrical body 8 is fittingly inserted in the through-hole 4e of the basal plate portion 4c and the through-hole 4n of the end plate segment 4b in the carrier 4 to become coaxial with the carrier 4.

Specifically, the lower end portion of the cylindrical body 8 is internally fitted to the cylindrical body-fitting section 4p of the through-hole 4n of the end plate segment 4b. The cylindrical body 8 extends upwardly through the through-hole 4e of the basal plate portion 4c. Specifically, the axially intermediate portion of the cylindrical body 8 is fittingly inserted in the cylindrical body-supporting hole section 4f of the through-hole 4e, and supported by the second portion 4g of the basal plate portion 4c. An upper end portion of the cylindrical body 8 extends toward the turning body 52 while protruding axially outwardly (upwardly) beyond the second portion 4g, and further protruding upwardly beyond a corresponding one of axially opposite ends (upper end) of the basal plate portion 4c.

In assembling between the turning body 52 and the carrier 4, respective central axes of the carrier 4 and the turning body 52 can be aligned with each other using the upper end portion of the cylindrical body 8. Specifically, the turning body 52 has a through-hole 52b provided in a central region of a flat plate portion 52a which is located on the lower part of the turning body 52 to axially penetrate therethrough. The through-hole 52b has a diameter approximately equal to the outer diameter of the cylindrical body 8. Thus, the central axes of the turning body 52 and the carrier 4 are aligned with each other by internally fitting the upper end portion of the cylindrical body 8 to the through-hole 52b of the turning body 52 before fastening the turning body 52 and the carrier 4 together. Then, after the central axis alignment, the turning body 52 and the carrier 4 are fastened to each other by the bolts 5a, so that the turning body 52 and the carrier 4 are joined together under a condition that the central axes thereof are accurately aligned with each other.

The cylindrical body 8 is formed with a sealing groove 8a in an outer periphery of the lower end portion thereof. A sealing ring 9a is installed in the sealing groove 8a. The sealing ring 9a is made of an elastic material. In a state after the lower end portion of the cylindrical body 8 is internally fitted to the cylindrical body-fitting section 4p of the end plate segment 4b, the sealing ring 9a is brought into press contact with an inner surface of the cylindrical body-fitting section 4p by an elastic force thereof. Thus, the sealing ring 9a functions as a sealing member, and also functions as an anti-rotation member for the cylindrical body. In other words, when the sealing ring 9a is brought into press contact with the inner surface of the cylindrical body-fitting section 4p so that it comes into close contact with the inner surface, the sealing ring 9a prevents the entry of lubrication oil from an outer side to an inner side of the cylindrical body 8, while preventing a rotation of the cylindrical body 8 about the axis thereof with respect to the carrier 4.

Further, the cylindrical body 8 is formed with a sealing groove 8b in an outer periphery of the upper end portion thereof, as with the lower end portion thereof. A sealing ring 9b is installed in the sealing groove 8b, in the same manner as described above. When the sealing ring 9b is brought into press contact with an inner surface of the through-hole 52b of the turning body 52 so that it comes into close contact with the inner surface, the sealing ring 9b functions as both a sealing member and an anti-rotation member.

The cylindrical body 8 has a groove 8c provided in an outer periphery of the axially intermediate portion thereof. The protruding member 10 is fitted in the groove 8c in such a manner that it protrudes radially outwardly from the outer surface of the cylindrical body 8. In the first embodiment, the protruding member 10 is comprised of a snap ring such as a C-ring. When the basal segment 4a and the end plate segment 4b of the carrier 4 are fastened together, the protruding member 10 fixed to the cylindrical body 8 and the lower end portion of the cylindrical body 8 are clamped from both sides (both upper and lower sides) in the axial direction, between the clamping portion 4i of the basal segment 4a and the clamping portion 4q of the end plate segment 4b. In this way, the cylindrical body 8 is fixed to the carrier 4. In the state after the protruding member 10 and the lower end portion of the cylindrical body 8 are clamped between the clamping portion 4i and the clamping portion 4q, the clamping portion 4i of the basal segment 4a presses the protruding member 10 from above by a given force. According to this pressing force, the protruding member 10 acts as a wedge-like member, and, in the groove 8c of the cylindrical body 8, the protruding member 10 is pressed axially downwardly. The rotation of the cylindrical body 8 around the axis is also suppressed by the above action of the protruding member 10.

In the cylindrical body 8, a remaining portion other than the lower end portion to which the first portion 4r of the carrier 4 is externally fitted and the axially intermediate portion to which the second portion 4g of the carrier 4 is externally fitted, is formed to have an outer diameter which is equal to or less than an outermost diameter of the lower end portion to which the first portion 4r is externally fitted, and equal to or less than an outermost diameter of the axially intermediate portion to which the second portion 4g is externally fitted. Specifically, the cylindrical body 8 is formed to have a uniform outer diameter, except portions formed with the sealing grooves 8a, 8b and the groove 8c.

The input shaft 12 functions as an input portion for inputting a rotation to the gear device. The input shaft 12 extends in parallel with an axis of the carrier 4. The input shaft 12 is rotatably mounted to the turning body 52 through a bearing 54. The input shaft 12 is joined to a drive shaft 56a of a drive motor 56 provided on the turning body 52. The input shaft 12 is rotated along with a driving of the drive motor 56. The input shaft 12 is provided with an input gear 12a on an outer peripheral surface of a lower end portion thereof.

Figure 2:
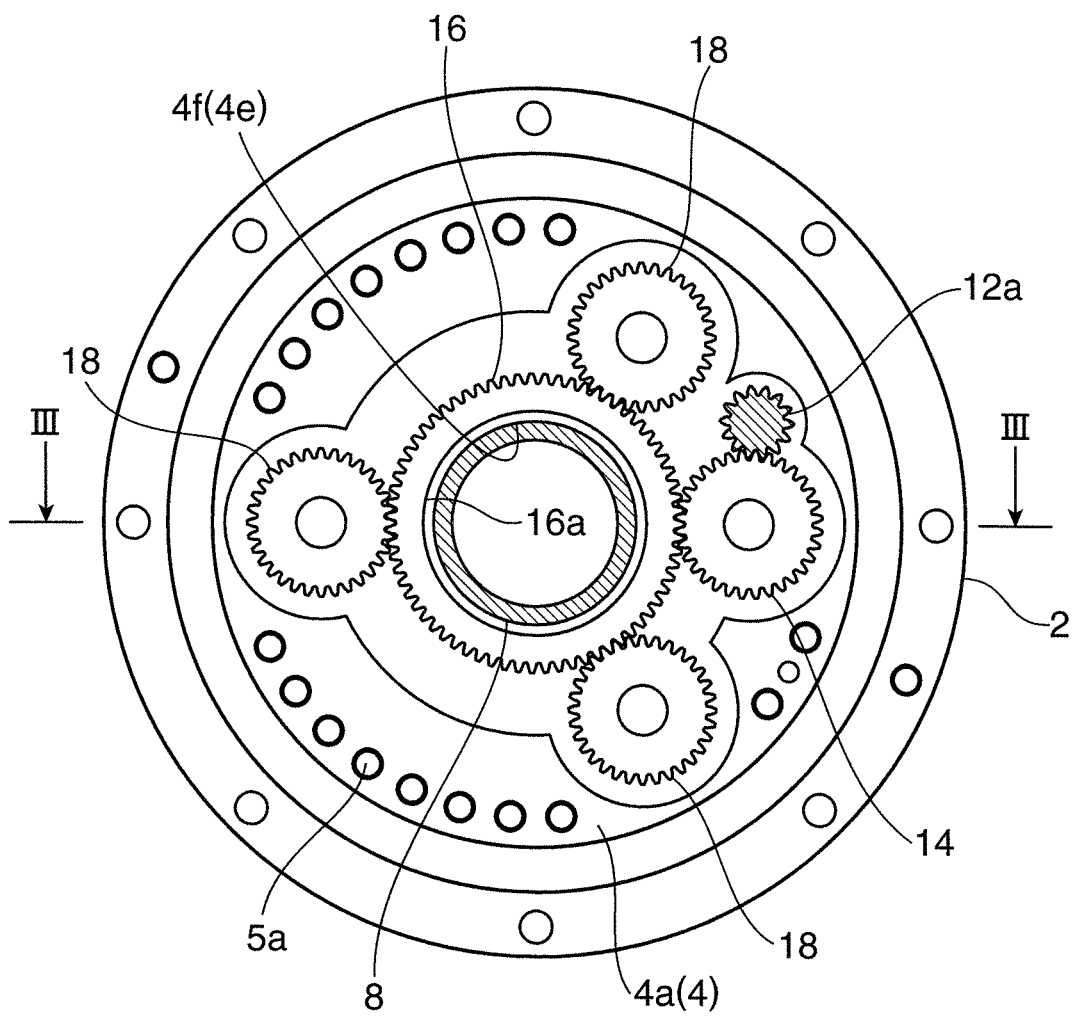
FIG. 2 is a horizontal sectional view of the gear device, taken along the line II-II in FIG. 1.
Figure 3:
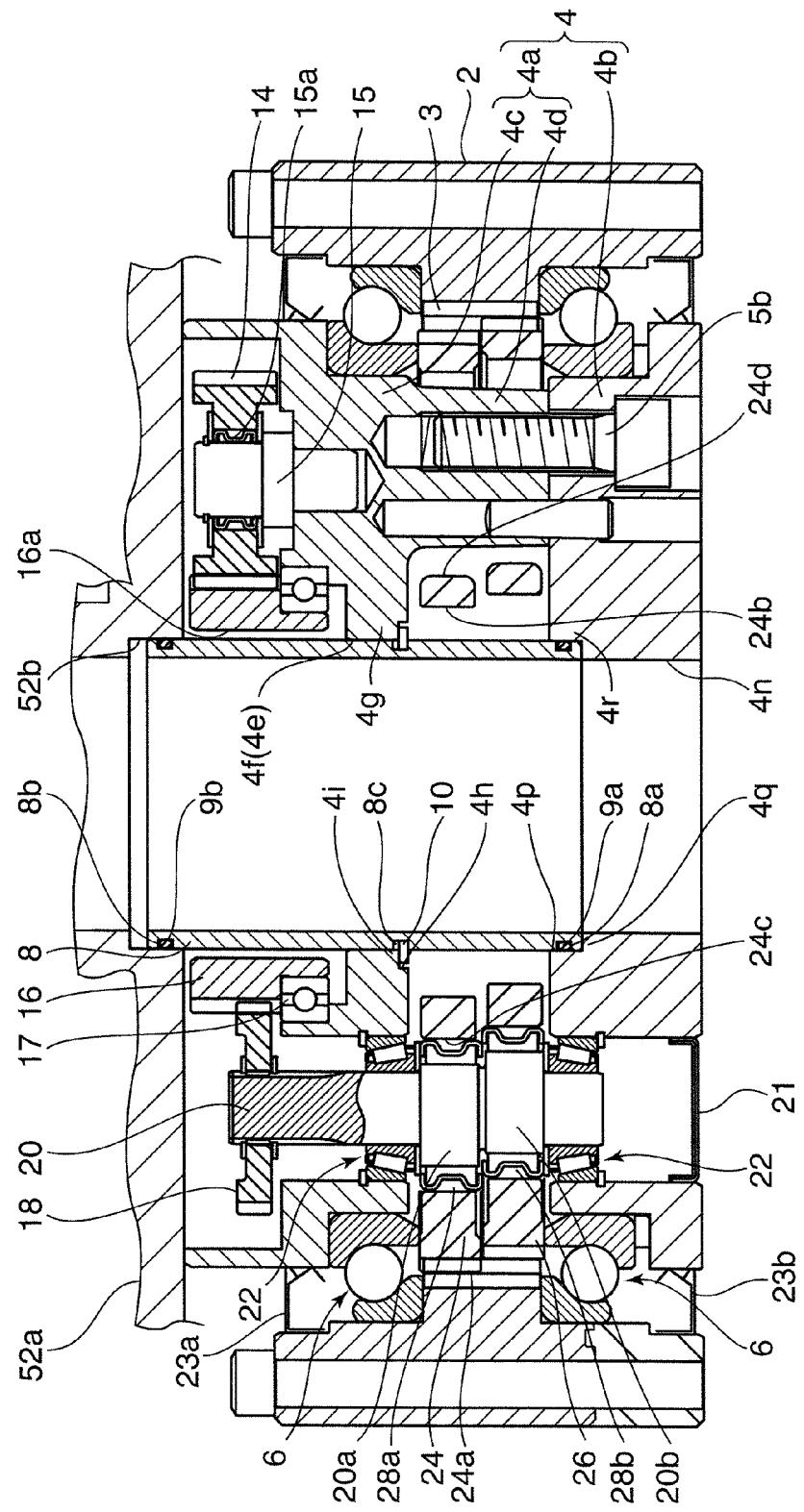
FIG. 3 is a vertical sectional view of the gear device, taken along the line III-III in FIG. 2.

As shown in FIG. 2, the intermediate gear 14 is meshed with each of the input gear 12a and the central gear 16. The intermediate gear 14 is operable to transmit a rotation of the input shaft 12 to the central gear 16. As shown in FIG. 3, the intermediate gear 14 is rotatably supported by a pivot portion 15 provided in the basal plate portion 4c of the carrier 4, through a bearing 15a.

The central gear 16 is provided in a radially central region of the basal plate portion 4c of the carrier 4. The central gear 16 has a through-hole 16a provided in a central region thereof to axially penetrate therethrough. The cylindrical body 8 is inserted in the through-hole 16a. The through-hole 16a has an inner diameter greater than the outer diameter of the cylindrical body 8. Thus, a gap is defined between an inner surface of the through-hole 16a and the outer surface of the cylindrical body 8. An outer periphery of a lower portion of the central gear 16 is mounted to the basal plate portion 4c through a bearing 17. Thus, the central gear 16 is adapted to be coaxially rotatable with respect to the carrier 4.

The crankshaft gear 18 is externally fitted to an upper end portion of the crankshaft 20. The crankshaft 20 includes two other crankshafts in addition to the crankshaft illustrated in FIG. 3. In other words, the crankshaft 20 is provided in a total number of three. The crankshaft gear 18 is mounted to an upper end portion of each of the crankshafts 20. Each of the crankshaft gears 18 is meshed with the central gear 16. Each of the crankshaft gears 18 is operable to transmit a rotation of the central great 16 to the crankshaft 20 to which the crankshaft gear 18 is mounted. Each of the crankshafts 20 is mounted to the carrier 4 through a pair of the crankshaft bearings 22 in a rotatable manner about an axis thereof. The crankshafts 20 are disposed at even intervals around the cylindrical body 8 inside the outer cylinder 2.

The crankshaft 20 has a first eccentric portion 20a and a second eccentric portion 20b. The first eccentric portion 20a and the second eccentric portion 20b are disposed between two portions of the crankshaft 20 supported by respective ones of the pair of crankshaft bearings 22, in side-by-side relation in the axial direction. Each of the first eccentric portion 20a and the second eccentric portion 20b is formed in a columnar shape eccentrically offset from a central axis of the crankshaft 20 by a given eccentric amount. The first eccentric portion 20a and the second eccentric portion 20b are disposed to have a phase difference therebetween by a given phase angle.

A sealing cap 21 is installed in the end plate segment 4b of the carrier 4 at a position beneath a lower end portion of the crankshaft 20. The sealing cap 21 is operable to prevent leakage of lubrication oil from a position of the end plate segment 4b where the sealing cap 21 is installed.

An oil seal 23a is installed between the basal plate portion 4c of the carrier 4 and the outer cylinder 2, and an oil seal 23b is installed between the end plate segment 4b of the carrier 4 and the outer cylinder 2. The oil seals 23a, 23b function as a sealing member. Leakage of lubrication oil outside the gear device is prevented by the oil seals 23a, 23b, the sealing rings 9a, 9b and the sealing cap 21.

The first external gear 24 is mounted to the first eccentric portion 20a of the crankshaft 20 through the first roller bearing 28a. The first external gear 24 is adapted, when the crankshaft 20 is being rotated, to be rockingly rotated while being meshed with the internal-tooth pins 3 on the inner surface of the outer cylinder 2, in conjunction with an eccentric rotation of the first eccentric portion 20a.

Specifically, the first external gear 24 is formed to become slightly smaller than an inner diameter of the outer cylinder 2. The first external gear 24 comprises a plurality of external teeth 24a, a central-region through-hole 24b, three first-eccentric-portion through-holes 24c, and three shaft-portion through-holes 24d.

The external teeth 24a are meshed with the internal-tooth pins 3. The number of the external teeth 24a is slightly less than the number of the internal-tooth pins 3.

The central-region through-hole 24b is provided in a radially central region of the first external gear 24. The cylindrical body 8 is loosely inserted in the central-region through-hole 24b.

The three first-eccentric-portion through-holes 24c are provided around the central-region through-hole 24b of the first external gear 24 at even intervals in a circumferential direction of the central-region through-hole 24b. The first eccentric portion 20a of each of the crankshafts 20 is inserted in a respective one of the first-eccentric-portion through-holes 24c, while interposing the first roller bearing 28a therebetween.

The three shaft-portion through-holes 24d are provided around the central-region through-hole 24b of the first external gear 24 at even intervals in a circumferential direction of the central-region through-hole 24b. Each of the shaft-portion through-holes 24d is arranged at a position between respective ones of the first-eccentric-portion through-holes 24c. Each of the shaft portions 4d of the carrier 4 is loosely inserted in a respective one of the shaft-portion through-holes 24d with a play.

The second external gear 26 is mounted to the second eccentric portion 20b of the crankshaft 20 through the second roller bearing 28b. The second external gear 26 is adapted, when the crankshaft 20 is being rotated, to be rockingly rotated while being meshed with the internal-tooth pins 3 on the inner surface of the outer cylinder 2, in conjunction with an eccentric rotation of the second eccentric portion 20b. The second external gear 26 has the same structure as that of the first external gear 24.

An operation of the gear device according to the first embodiment will be described below.

Firstly, according to a driving of the drive motor 56, the input shaft 12 is rotated. Thus, the input gear 12a is rotated together with the input shaft 12. Then, the rotation of the input gear 12a is transmitted to each of the crankshaft gears 18 via the intermediate gear 14 and the central gear 16. Thus, each of the crankshafts 20 are rotated about the axis thereof.

Then, along with the rotation of each of the crankshafts 20, each of the first eccentric portion 20a and the second eccentric portion 20b of the crankshaft 20 is eccentrically rotated. Thus, the first external gear 24 is rockingly rotated while being meshed with the internal-tooth pins 3 on the inner surface of the outer cylinder 2, in conjunction with the eccentric rotation of the first eccentric portion 20a. Concurrently, the second external gear 26 is rockingly rotated while being meshed with the internal-tooth pins 3 on the inner surface of the outer cylinder 2, in conjunction with the eccentric rotation of the second eccentric portion 20b. The rocking rotations of the first external gear 24 and the second external gear 26 are transmitted to the carrier 4 via the respective crankshafts 20. Thus, the carrier 4 and the turning body 52 are relatively rotated with respect to the outer cylinder 2 and the base 50 at a rotational speed reduced from the rotation of the input shaft 12.

As described above, in the first embodiment, the first portion 4r of the carrier 4 is externally fitted to the lower end portion of the cylindrical body 8, and the second portion 4g of the carrier 4 is externally fitted to the axially intermediate portion of the cylindrical body 8, so that the cylindrical body 8 is supported in two positions spaced apart from each other in the axial direction. This makes it possible to suppress radial vibration which would otherwise occur in the upper end portion of the cylindrical body 8 when the cylindrical body 8 is rotated together with the carrier 4, as compared with the conventional gear device where only one end portion of the cylindrical body is fixed to the carrier. In addition, in the first embodiment, the cylindrical body 8 is fixed to the carrier 4 simply by externally fitting the first portion 4r and the second portion 4g of the carrier 4 to the cylindrical body 8, so that it is not necessary to form, on the cylindrical body, a flange for fixing the carrier, as in the conventional gear device. This makes it possible to reduce time and effort required for machining of the cylindrical body 8. Thus, in the first embodiment, it becomes possible to suppress radial vibration which would otherwise occur in the upper end portion of the cylindrical body 8 extending toward the turning body 52 to be connected to the gear device, while preventing an increase in time and effort required for machining of the cylindrical body 8.

In the first embodiment, the upper end portion of the cylindrical body 8 disposed coaxially with the carrier 4 extends toward the turning body 52 while protruding axially outwardly (upwardly) beyond the second portion 4g of the carrier 4, so that respective central axes of the carrier 4 and the turning body 52 can be aligned with each other by fitting the through-hole 52b provided in the central region of the turning body 52 onto the upper end portion of the cylindrical body 8.

In the first embodiment, a remaining portion other than the two portions of the cylindrical body 8 to which the first portion 4r and the second portion 4g of the carrier 4 are externally fitted, has an outer diameter which is equal to or less than an outermost diameter of the portion to which the first portion 4r is externally fitted, and equal to or less than an outermost diameter of the portion to which the second portion 4g is externally fitted, so that a portion of the cylindrical body 8 to be subjected to cutting can be reduced to prevent an increase in time and effort required for machining of the cylindrical body 8, as compared with a structure where a protruding portion having an outer diameter greater than the outermost diameter of the portion to which the first portion 4r is externally fitted, and the outermost diameter of the portion to which the second portion 4g is externally fitted, is formed on the remaining portion other than the two portions of the cylindrical body 8 to which the first portion 4r and the second portion 4g of the carrier 4 are externally fitted.

In the first embodiment, there is no need to provide a flange onto the cylindrical body 8 as in the conventional gear device, so that it becomes possible to prevent an operation of inserting the cylindrical body 8 into the gear device from an upper side to a lower side thereof in the axial direction to assemble the cylindrical body 8 to the gear device from being hindered by the flange. Further, in cases where a flange of the cylindrical body is fastened to the carrier from below the gear device as in the conventional gear device, it is necessary to perform an operation of turning the gear device upside down. In the first embodiment, there is no need for such a turning operation. Therefore, the operation of assembling the cylindrical body 8 to the gear device can be simplified.

In the first embodiment, the carrier 4 has the pair of clamping portions 4q, 4i which clamp the lower end portion of the cylindrical body 8 and the protruding member 10 provided on the axially intermediate portion of the cylindrical body 8 from both sides in the axial direction, so that the cylindrical body 8 can be reliably fixed to the carrier 4 in the axial direction by the pair of clamping portions 4q, 4i. In the first embodiment, a portion to be supported by the clamping portion 4i of the carrier 4 is comprised of the protruding member 10 fitted in the groove 8c provided in the outer periphery of the axially intermediate portion of the cylindrical body 8, so that it becomes possible to suppress an increase in time and effort required for machining of the cylindrical body 8, as compared with a structure where the portion to be supported is integrally formed with the cylindrical body 8 to protrude from the outer periphery of the axially intermediate portion of the cylindrical body 8. Specifically, in the structure where the portion to be supported by the clamping portion 4i of the carrier 4 is integrally formed with the cylindrical body 8 to protrude from the outer periphery of the axially intermediate portion of the cylindrical body 8, it is necessary to remove most of a remaining portion other than the protruding portion by cutting during machining of the cylindrical body 8. In contrast, in the first embodiment, all that is required is to cut the groove 8c in the intermediate portion of the cylindrical body 8 to allow the protruding member 10 to be fitted thereinto, so that a portion of the cylindrical body 8 to be subjected to cutting is reduced, as compared with the structure where the protruding portion is integrally formed with the cylindrical body 8, and thereby the time and effort required for machining of the cylindrical body 8 can be suppressed. Therefore, in the first embodiment, the cylindrical body 8 can be reliably fixed to the carrier 4 in the axial direction while suppressing an increase in time and effort required for machining of the cylindrical body 8.

In the first embodiment, the protruding member 10 is comprised of a snap ring. This snap ring is provided over an approximately entire circumference of the cylindrical body 8, so that the clamping portion 4i of the carrier 4 can support the snap ring over the approximately entire circumference of the cylindrical body 8. Thus, in the first embodiment, it becomes possible to more stably fix the cylindrical body 8 to the carrier 4, as compared with a structure where the protruding member is provided on only a part of a circumferential portion of the cylindrical body 8.

In the first embodiment, the carrier 4 has a structure where the basal segment 4a and the end plate segment 4b are fastened to each other while allowing the first external gear 24 and the second external gear 26 to be housed therein. Further, the clamping portion 4q supporting the lower end portion of the cylindrical body 8 is provided in the end plate segment 4b, and the clamping portion 4i supporting the protruding member 10 mounted to the cylindrical body 8 is provided in the basal segment 4a. Thus, by using a fastening force between the basal segment 4a and the end plate segment 4b of the carrier 4, the lower end portion of the cylindrical body 8 and the protruding member 10 fixed to the cylindrical body 8 can be clamped between the clamping portion 4q and the clamping portion 4i in the axial direction while allowing the external gears 24, 26 to be housed between the basal segment 4a and the end plate segment 4b.

In the first embodiment, the sealing ring 9a functioning as an anti-rotation member is installed in the outer periphery of the lower end portion of the cylindrical body 8 fittingly inserted in the cylindrical body-fitting section 4p of the end plate segment 4b of the carrier 4, so that a rotation of the cylindrical body 8 with respect to the carrier 4 is prevented by the sealing ring 9a. This makes it possible to prevent friction between the cylindrical body 8 and the carrier 4 which would otherwise occur during a rotation of the cylindrical body 8, and prevent the occurrence of an abrasion powder due to the friction. Further, the upper end portion of the cylindrical body 8 is fittingly inserted in the through-hole 52b of the turning body 52 fixed to the basal plate portion 4c of the carrier 4, and the sealing ring 9b functioning as an anti-rotation member is also installed in the outer periphery of the upper end portion of the cylindrical body 8, so that the rotation of the cylindrical body 8 with respect to the carrier 4 and the occurrence of an abrasion powder are also prevented by the sealing ring 9b.

In the first embodiment, the upper end portion of the cylindrical body 8 protrudes axially outwardly (upwardly) beyond a corresponding one of axially opposite end portions (upper end portion) of the carrier 4. In a structure where the upper end portion of the cylindrical body 8 does not protrude axially outwardly beyond the upper end portion of the carrier 4, a portion around the fitting through-hole 52b of the turning body 52 has to be formed to protrude toward the carrier 4 in such a manner as to be fittable to the upper end portion of the cylindrical body 8, in order to allow respective central axes of the carrier 4 and the turning body 52 to be aligned with each other using the upper end portion of the cylindrical body 8. In this case, a radially outward region of a peripheral portion of the fitting through-hole 52b of the turning body 52 has to be entirely cut away to allow the peripheral portion to protrude outwardly, which causes an increase in time and effort required for machining of the turning body 52. In contrast, in the first embodiment, the upper end portion of the cylindrical body 8 protrudes axially outwardly beyond the upper end portion of the carrier 4, as described above, so that there is no need to perform the cutting for allowing the peripheral portion of the through-hole 52b of the turning body 52 to protrude outwardly. This makes it possible to reduce the time and effort required for machining of the turning body 52.

Second Embodiment

Figure 4:
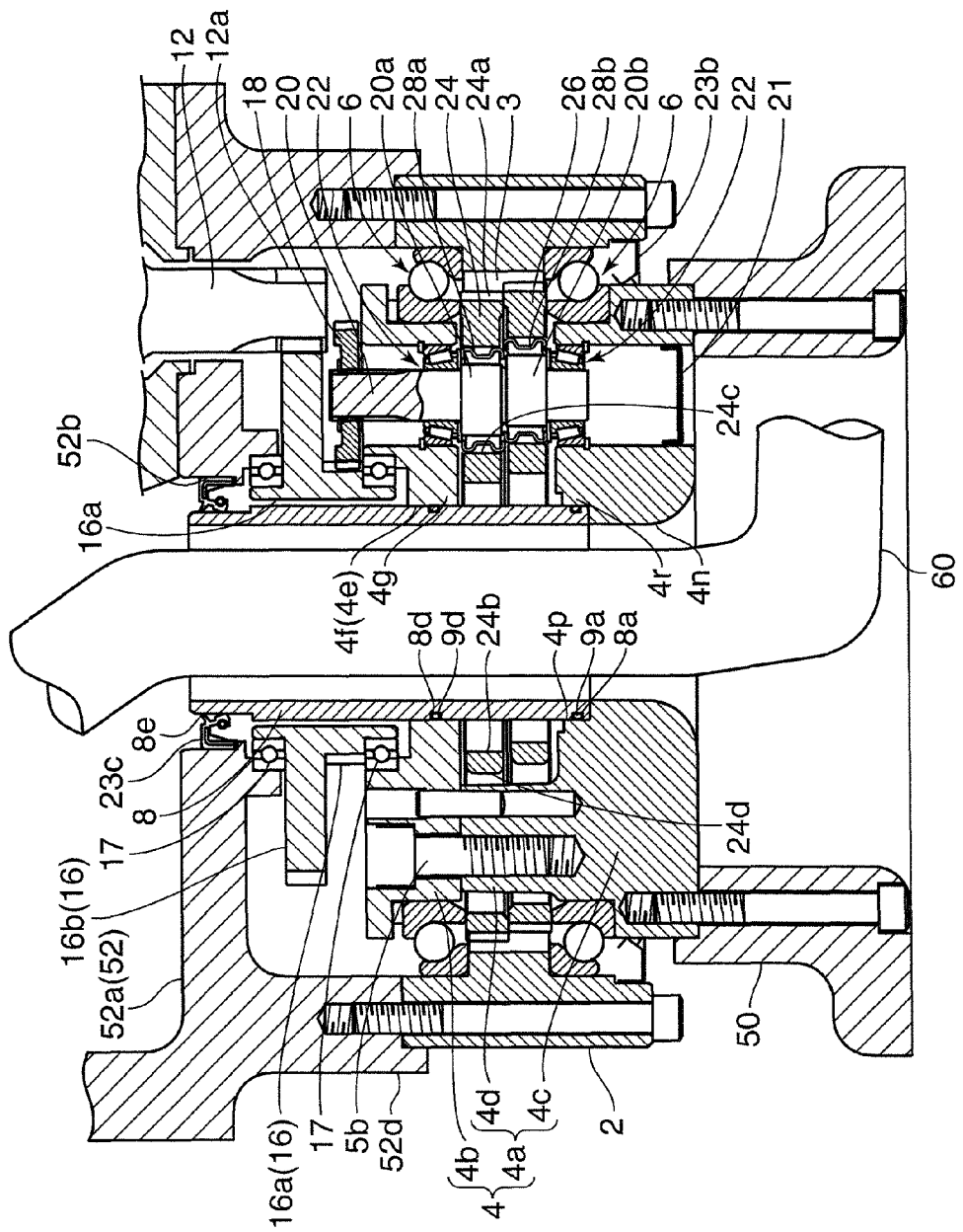
FIG. 4 is a vertical sectional view of a gear device according to a second embodiment of the present invention, a turning body, and a base.
Figure 5:
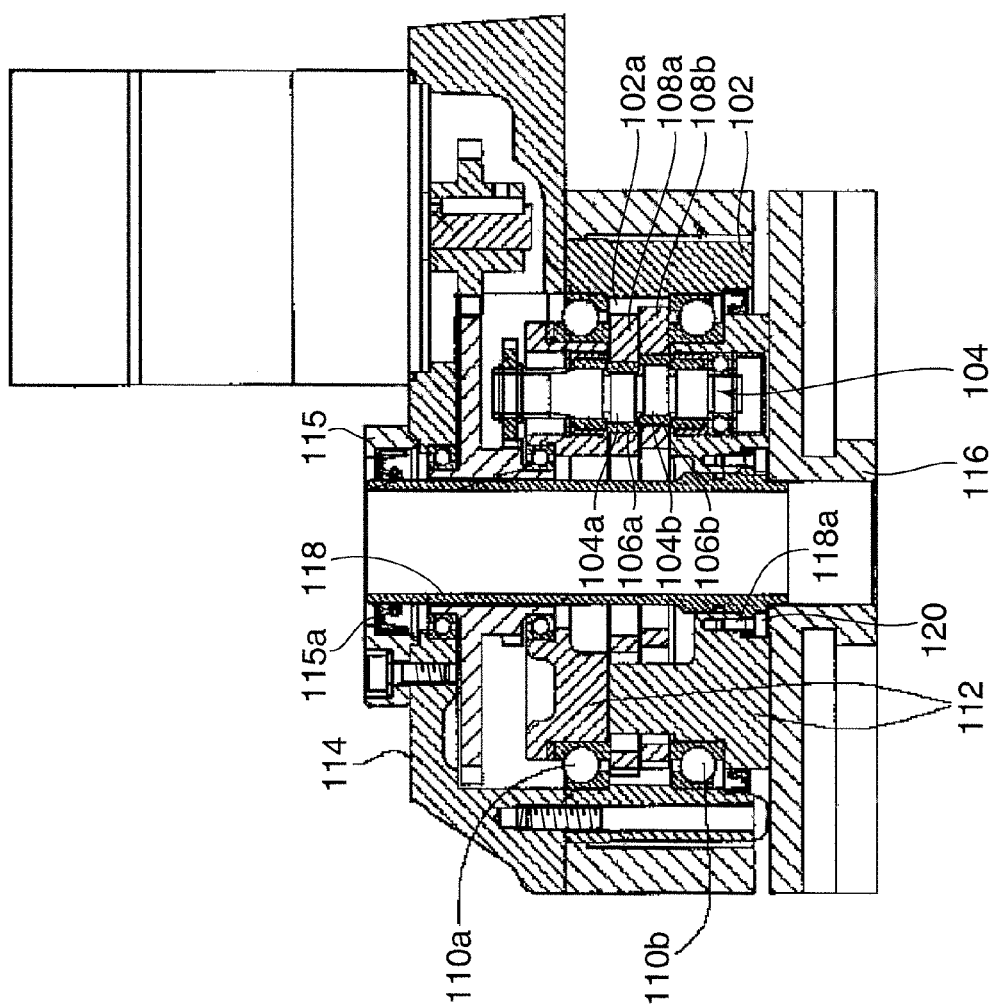
FIG. 5 is a vertical sectional view of one example of a conventional gear device.

With reference to FIG. 4, a structure of a gear device according to a second embodiment of the present invention will be described below.

The gear device according to the second embodiment is different from the gear device according to the first embodiment in the following points. A cylindrical body 8 is fixed to a carrier 4 in such a manner that it is kept from being moved in a rotation direction and an axial direction thereof by a sealing ring 9a installed in a lower end portion of the cylindrical body 8 to which a first portion 4r of the carrier 4 is externally fitted, and a sealing ring 9d installed in an axially intermediate portion of the cylindrical body 8 to which a second portion 4g of the carrier 4 is externally fitted.

Specifically, in the second embodiment, a basal segment 4a and an end plate segment 4b of the carrier 4 are disposed upside down as compared with the first embodiment. Further, a basal plate portion 4c of the basal segment 4a has the aforementioned through-hole 4n, the aforementioned cylindrical body-fitting hole 4p, and the first portion 4r externally fitted to the lower end portion of the cylindrical body 8. On the other hand, the end plate segment 4b has the aforementioned cylindrical body-supporting hole section 4f (through-hole 4e), and the second portion 4g externally fitted to the axially intermediate portion of the cylindrical body 8.

Further, a sealing-ring groove 8d is formed in an outer periphery of the axially intermediate portion of the cylindrical body 8 to which the second portion 4g is externally fitted. A sealing ring 9d serving as an anti-rotation member is fitted in the sealing-ring groove 8d. The sealing ring 9d is brought into press contact with an inner surface of the cylindrical body-supporting hole section 4f of the second portion 4g by an elastic force thereof to come into close contact with the inner surface. The cylindrical body 8 also has a sealing-ring groove 8a formed in the lower end portion thereof, as with the first embodiment. The sealing ring 9a is fitted in the sealing groove 8a. The sealing ring 9a is in close contact with an inner surface of the cylindrical body-fitting hole 4p. The cylindrical body 8 is fixed to the carrier 4 in such a manner that it is kept from being moved in the rotation direction and the axial direction by the close contact of the sealing ring 9d with the inner surface of the cylindrical body-supporting hole section 4f and the close contact of the sealing ring 9a with the inner surface of the cylindrical body-fitting hole 4p.

In the second embodiment, in the cylindrical body 8, a remaining portion other than the lower end portion to which the first portion 4r of the carrier 4 is externally fitted and the axially intermediate portion to which the second portion 4g of the carrier 4 is externally fitted, is formed to have an outer diameter which is equal to or less than an outermost diameter of the lower end portion to which the first portion 4r is externally fitted, and equal to or less than an outermost diameter of the axially intermediate portion to which the second portion 4g is externally fitted, as with the first embodiment. Further, an upper end portion 8e of the cylindrical body 8 is formed to have an outer diameter less than an outer diameter of a remaining portion other than the upper end portion 8e. The upper end portion 8e of the cylindrical body 8 is inserted in a through-hole 52b of a turning body 52. In the second embodiment, the through-hole 52b of the turning body 52 is formed to have an inner diameter greater than the outer diameter of the upper end portion 8e of the cylindrical body 8. An oil seal 23c as a sealing member is installed between an inner surface of the through-hole 52b and an outer surface of the upper end portion 8e of the cylindrical body 8. The oil seal 23c is operable to prevent leakage of lubrication oil from between the inner surface of the through-hole 52b and the outer surface of the upper end portion 8e of the cylindrical body 8 to an outside of the gear device.

In the second embodiment, an outer cylinder 2 is fastened to the turning body 52. Specifically, the turning body 52 has a cylindrical portion 52d protruding downwardly from an outer edge portion of a flat plate portion 52a which is located on a lower portion of the turning body 52. A lower end portion of the cylindrical portion 52d is butted against an upper end portion of the outer cylinder 2, and, in this state, the cylindrical portion 52d and the outer cylinder 2 are fastened together. On the other hand, the carrier 4 is fastened to a base 50. Specifically, the base 50 has a cylindrical-shaped portion with an inner diameter conforming to an outer diameter of the basal plate portion 4c of the carrier 4. An upper end portion of the cylindrical-shaped portion is joined against a lower end portion of the basal plate portion 4c, and, in this state, the base 50 and the basal plate portion 4c are fastened together.

Further, an input gear 12a is directly meshed with a central gear 16 without interposing the aforementioned intermediate gear 14 therebetween. Specifically, the central gear 16 has a first gear portion 16a meshed with a crankshaft gear 18, and a second gear portion 16b having a diameter greater than that of the first gear portion 16a. The second gear portion 16b is meshed with the input gear 12a.

A remaining structure of the gear device according to the second embodiment other than the above points is the same as that of the gear device according to the first embodiment.

In the second embodiment, the upper end portion 8e of the cylindrical body 8 has an outer diameter less than an outer diameter of a remaining portion of the cylindrical body 8 other than the upper end portion 8e. Thus, when the upper end portion 8e of the cylindrical body 8 is fitted into the through-hole 52b of the turning body 52 through the oil seal 23c, the oil seal 23c can have a smaller inner diameter, as compared with a structure where the outer diameter of the upper end portion 8e of the cylindrical body 8 is equal to the outer diameter of the remaining portion other than upper end portion 8e. This makes it possible to reduce a tightening force to be applied from the oil seal 23c to the cylindrical body 8.

In the second embodiment, radial vibration of the upper end portion 8e of the cylindrical body 8 can be suppressed as with the first embodiment, so that it becomes possible to suppress the occurrence of a small gap between the upper end portion 8e of the cylindrical body 8 and the oil seal 23c due to the vibration, and thereby suppress leakage of lubrication oil from the small gap.

Other effects to be obtained by the second embodiment are the same as those to be obtained by the first embodiment.

The embodiments disclosed above shall be interpreted as illustrative at all points but not in a limiting sense. The scope of the present invention should be determined by the appended claims but not by the above embodiments, and the present invention is intended to cover alternatives, modifications and equivalents, which may be included within the scope of the present invention as defined by the appended claims.

For example, although the upper end portion of the cylindrical body 8 is designed to protrude axially outwardly beyond the clamping portion 4i of the basal plate portion 4c of the carrier 4, it may be designed not to protrude beyond the turning body-side end of the carrier 4.

Further, any suitable member other than a snap ring may be used as the protruding member 10. Specifically, a protruding member to be provided on only a part of the outer periphery of the cylindrical body 8, or a protruding member comprising a plurality of pieces divided in the circumferential direction of the cylindrical body 8, may be used.

The gear device may be designed by replacing the upward-downward direction described in the above embodiments with any suitable direction other than the upward-downward direction.

The present invention may be applied to a gear device in which one of the mating members in the appended claims is the turning body 52, and the other mating member is the base 50.

The gear device may be designed such that the clamping portion supporting one of the end portions of the cylindrical body 8 is provided in the basal segment 4a, and the clamping portion supporting the protruding member 10 may be provided in the end plate segment 4b.

SUMMARY OF EMBODIMENTS

The above embodiments may be summarized as follows.

The gear device according to the embodiments of the present invention is a gear device capable of transmitting rotational force between a pair of mating members at a predetermined speed reduction ratio, which comprises: an outer cylinder fixed to one of the mating members and provided with internal teeth on an inner surface thereof; a crankshaft provided inside the outer cylinder in a rotatable manner about an axis thereof and having an eccentric portion; an external gear mounted to the eccentric portion of the crankshaft and adapted to be rockingly rotated while being meshed with the internal teeth, in conjunction with an eccentric rotation of the eccentric portion; a carrier fixed to the other mating member and having a through-hole formed in a central region thereof to axially penetrate therethrough, wherein the carrier is adapted, according to the rocking rotation of the external gear transmitted thereto, to be rotated relatively and coaxially with respect to the outer cylinder; and a cylindrical body fittingly inserted in the through-hole to become coaxial with the carrier, wherein the carrier has a first portion externally fitted to one of opposite end portions of the cylindrical body, and a second portion disposed in axially spaced-apart relation to the first portion and externally fitted to an axially intermediate portion of the cylindrical body, and wherein: the other end portion of the cylindrical body extends toward a corresponding one of the mating members while protruding axially outwardly beyond the second portion; and a remaining portion other than the two portions of the cylindrical body to which the first and second portions are externally fitted, has an outer diameter equal to or less than an outermost diameter of the portion to which the first portion is externally fitted, and an outermost diameter of the portion to which the second portion is externally fitted.

In this gear device, the first portion of the carrier is externally fitted to the one end portion of the cylindrical body, and the second portion of the carrier is externally fitted to the axially intermediate portion of the cylindrical body, so that the cylindrical body is supported in two positions axially spaced apart from each other by the carrier. This makes it possible to suppress radial vibration which would otherwise occur in the other end portion of the cylindrical body when the cylindrical body is rotated together with the carrier, as compared with the conventional gear device where only one end portion of the cylindrical body is fixed to the carrier. In addition, in this gear device, the cylindrical body is fixed to the carrier simply by externally fitting the first portion and the second portion of the carrier to the cylindrical body, so that it is not necessary to form, on the cylindrical body, a flange for fixing the carrier, as in the conventional gear device. This makes it possible to reduce time and effort required for machining of the cylindrical body. Thus, in this gear device, it becomes possible to suppress radial vibration which would otherwise occur in the other end portion of the cylindrical body extending toward the mating member to be connected to the gear device, while preventing an increase in time and effort required for machining of the cylindrical body.

In this gear device, the other end portion of the cylindrical body disposed coaxially with the carrier extends toward a corresponding one of the mating members while protruding axially outwardly beyond the second portion of the carrier, so that respective central axes of the carrier and the corresponding mating member can be aligned with each other by providing a fitting through-hole in a central region of corresponding mating member and fitting the fitting through-hole onto the other end portion of the cylindrical body. In this gear device, a remaining portion other than the two portions of the cylindrical body to which the first portion and the second portion of the carrier are externally fitted, has an outer diameter which is equal to or less than an outermost diameter of the portion to which the first portion is externally fitted, and equal to or less than an outermost diameter of the portion to which the second portion is externally fitted, so that a portion of the cylindrical body to be subjected to cutting can be reduced so as to prevent an increase in time and effort required for machining of the cylindrical body, as compared with a structure where a protruding portion having an outer diameter greater than the outermost diameter of the portion to which the first portion is externally fitted, and the outermost diameter of the portion to which the second portion is externally fitted, is formed on the remaining portion other than the two portions to which the first portion and the second portion are externally fitted.

In the above gear device, the cylindrical body may have a groove provided in an outer periphery of the axially intermediate portion thereof, wherein a protruding member is fitted in the groove so as to protrude from an outer surface of the cylindrical body, and the carrier may have a pair of clamping portions clamping the one end portion of the cylindrical body and the protruding member from both sides in the axial direction of the cylindrical body.

In this structure, the one end portion of the cylindrical body and the protruding member can be fixed by clamping them from both sides in the axial direction using the pair of clamping portions of the carrier, so that the cylindrical body can be reliably fixed to the carrier. In this structure, one of the two portions to be clamped by the clamping portions of the carrier is comprised of the protruding member fitted in the groove provided in the outer periphery of the axially intermediate portion of the cylindrical body, so that it becomes possible to suppress an increase in time and effort required for machining of the cylindrical body, as compared with a structure where one of the two portions to be clamped by the clamping portions of the carrier is integrally formed with the cylindrical body to protrude from the outer periphery of the axially intermediate portion of the cylindrical body. Specifically, in the structure where one of the two portions to be clamped by the clamping portions of the carrier is integrally formed with the cylindrical body to protrude from the outer periphery of the axially intermediate portion of the cylindrical body, it is necessary to remove most of a remaining portion other than the protruding portion by cutting during machining of the cylindrical body. In contrast, in this structure, all that is required is to cut the groove in the intermediate portion of the cylindrical body to allow the protruding member to be fitted thereinto, so that a portion of the cylindrical body to be subjected to cutting is reduced, as compared with the structure where the protruding portion is integrally formed with the cylindrical body, and thereby an increase in time and effort required for machining of the cylindrical body can be suppressed. Therefore, in this structure, the cylindrical body can be reliably fixed to the carrier in the axial direction while suppressing an increase in time and effort required for machining of the cylindrical body.

In this case, the protruding member may be comprised of a snap ring.

In this structure, the snap ring is provided over an approximately entire circumference of the cylindrical body, so that a corresponding one of the clamping portions of the carrier can support the snap ring over the approximately entire circumference of the cylindrical body. Thus, in this structure, it becomes possible to more stably fix the cylindrical body to the carrier, as compared with a structure where the protruding member is provided on only a part of a circumferential portion of the cylindrical body.

Preferably in the gear device where the carrier has the pair of clamping portions, the carrier has a structure comprising a basal segment and an end plate segment which are fastened to each other while allowing the external gear to be housed therein, and one of the clamping portions supporting the one end portion of the cylindrical body is provided in one of the basal segment and the end plate segment, and the other clamping portion supporting the protruding member is provided in a remaining one of the basal segment and the end plate segment.

In this structure, by using a fastening force between the basal segment and the end plate segment of the carrier, the one end portion of the cylindrical body and the protruding member can be clamped between the clamping portion provided in the end plate segment and the clamping portion provided in the basal segment while allowing the external gear to be housed between the basal segment and the end plate segment.

Preferably in the above gear device where an anti-rotation member is provided on an outer periphery of a portion of the cylindrical body fittingly inserted in the through-hole of the carrier.

In this structure, a rotation of the cylindrical body with respect to the carrier is prevented by the anti-rotation member, so that it becomes possible to prevent friction between the cylindrical body and the carrier which would otherwise occur during a rotation of the cylindrical body, and prevent the occurrence of an abrasion powder due to the friction.

Preferably, in the above gear device, the other end portion of the cylindrical body protrudes axially outwardly beyond a corresponding one of axially opposite end portions of the carrier.

In a structure where the other end portion of the cylindrical body does not protrude axially outwardly beyond a corresponding one of axially opposite end portions of the carrier, a portion around a fitting through-hole of a corresponding one of the mating members has to be formed to protrude toward the carrier in such a manner as to be fittable to the other end portion of the cylindrical body, in order to allow respective central axes of the carrier and the corresponding mating member to be aligned with each other using the other end portion of the cylindrical body. In this case, a radially outward region of a peripheral portion of the fitting through-hole of the corresponding mating member has to be entirely cut away to allow the peripheral portion to protrude outwardly, which causes an increase in time and effort required for machining of the mating member. In contrast, in this structure, the other end portion of the cylindrical body protrudes axially outwardly beyond the end portion of the carrier, so that there is no need to perform the cutting for allowing the peripheral portion of the fitting through-hole of the corresponding mating member to protrude outwardly, which makes it possible to reduce the time and effort required for machining of the mating member.

Preferably, in the above gear device, the other end portion of the cylindrical body has an outer diameter less than an outer diameter of a remaining portion of the cylindrical body.

In this structure, when the other end portion of the cylindrical body is fitted to the corresponding mating member through a sealing member, the sealing member can have a smaller inner diameter, as compared with a structure where the outer diameter of the other end portion of the cylindrical body is equal to the outer diameter of the remaining portion other than the other end portion. This makes it possible to reduce a tightening force to be applied from the sealing member to the cylindrical body.

The invention claimed is:

1. A gear device capable of transmitting rotational force between a pair of mating members at a predetermined speed reduction ratio, comprising:
    an outer cylinder fixed to one of the mating members and provided with internal teeth on an inner surface thereof;
    a crankshaft provided inside the outer cylinder in a rotatable manner about an axis thereof and having an eccentric portion;
    an external gear mounted to the eccentric portion of the crankshaft and adapted to be rockingly rotated while being meshed with the internal teeth, in conjunction with an eccentric rotation of the eccentric portion;
    a carrier fixed to the other mating member and having a through-hole formed in a central region thereof to axially penetrate therethrough, wherein the carrier is adapted, according to the rocking rotation of the external gear transmitted thereto, to be rotated relatively and coaxially with respect to the outer cylinder; and
    a cylindrical body fittingly inserted in the through-hole to become coaxial with the carrier,
    wherein the carrier has a first portion externally fitted in a fixed position relative to one of opposite end portions of the cylindrical body, and a second portion disposed in axially spaced-apart relation to the first portion and externally fitted in a fixed position relative to an axially intermediate portion of the cylindrical body;
    the other end portion of the cylindrical body extends toward a corresponding one of the mating members while protruding axially outwardly beyond the second portion; and
    a remaining portion other than the two portions of the cylindrical body to which the first and second portions are externally fitted, has an outer diameter equal to or less than an outermost diameter of the portion to which the first portion is externally fixed, and an outermost diameter of the portion to which the second portion is externally fixed.

2. The gear device as defined in claim 1, wherein:
    the cylindrical body has a groove provided in an outer periphery of the axially intermediate portion thereof, a protruding member is fitted in the groove so as to protrude from an outer surface of the cylindrical body; and
    the carrier has a pair of clamping portions clamping the one end portion of the cylindrical body and the protruding member from both sides in the axial direction of the cylindrical body.

3. The gear device as defined in claim 2, wherein the protruding member is comprised of a snap ring.

4. The gear device as defined in claim 2, wherein:
    the carrier has a structure comprising a basal segment and an end plate segment which are fastened to each other while allowing the external gear to be housed therein; and one of the clamping portions supporting the one end portion of the cylindrical body is provided in one of the basal segment and the end plate segment, and the other clamping portion supporting the protruding member is provided in a remaining one of the basal segment and the end plate segment.

5. The gear device as defined in claim 1, wherein an anti-rotation member is provided on an outer periphery of a portion of the cylindrical body fittingly inserted in the through-hole of the carrier.

6. The gear device as defined in claim 1, wherein the other end portion of the cylindrical body protrudes axially outwardly beyond a corresponding one of axially opposite end portions of the carrier.

7. The gear device as defined in claim 1, wherein the other end portion of the cylindrical body has an outer diameter less than an outer diameter of a remaining portion of the cylindrical body.

\* \* \* \* \*